United States Patent [19]

Heine et al.

[11] Patent Number: 4,774,857
[45] Date of Patent: Oct. 4, 1988

[54] TWO SPEED AXLE ASSEMBLY

[75] Inventors: Charles F. Heine, New Haven; Richard L. Pifer; James A. Krisher, both of Fort Wayne, all of Ind.

[73] Assignee: Dana Corporation, Toledo, Ohio

[21] Appl. No.: 11,323

[22] Filed: Feb. 5, 1987

[51] Int. Cl.[4] .......................... F16H 3/44; F16H 57/10
[52] U.S. Cl. .................................. 74/789; 192/48.92; 192/12 C
[58] Field of Search ............ 74/789; 192/48.92, 12 C, 192/13 R, 17 A, 18 A, 88 A

[56] References Cited

U.S. PATENT DOCUMENTS

| | | | |
|---|---|---|---|
| 2,312,263 | 2/1943 | Ormsby | 74/695 |
| 2,480,210 | 8/1949 | Avila | 74/695 |
| 2,879,868 | 3/1959 | Eakin | 192/174 X |
| 3,055,237 | 9/1962 | Magnuson | 74/789 |
| 3,187,598 | 6/1965 | Hennessey et al. | 192/48.92 |
| 3,228,261 | 1/1966 | Puls et al. | 74/770 |
| 3,352,166 | 11/1967 | Margnart et al. | 74/15.84 |
| 3,718,054 | 2/1973 | Perkins et al. | 74/751 |
| 3,741,037 | 6/1973 | Piret | 74/763 |
| 3,805,632 | 4/1974 | Prokop et al. | 192/48.92 X |
| 3,954,028 | 5/1976 | Windish | 74/792 |
| 4,265,135 | 5/1981 | Smirl | 74/336 B |
| 4,290,322 | 9/1981 | Huitema | 74/752 A |
| 4,425,989 | 1/1984 | Gotoda | 192/48.92 |
| 4,441,691 | 4/1984 | Nagahara et al. | 254/344 |
| 4,453,430 | 6/1984 | Sell | 74/770 |
| 4,484,495 | 11/1984 | Mason | 74/785 |
| 4,502,353 | 3/1985 | Beaudoin | 74/792 |
| 4,531,429 | 7/1985 | Shult et al. | 74/792 |
| 4,532,827 | 8/1985 | Beim | 192/12 C X |
| 4,567,788 | 2/1986 | Miller | 74/789 |
| 4,624,355 | 11/1986 | Mroz | 192/88 A X |
| 4,688,664 | 8/1987 | Miller | 192/12 C X |
| 4,706,521 | 11/1987 | Anderson et al. | 74/785 |

Primary Examiner—Dirk Wright
Attorney, Agent, or Firm—Richard C. Darr; Frank B. McDonald

[57] ABSTRACT

A two speed axle assembly for automotive vehicles, providing positive shift engagement in shifting between direct and overdrive modes. Input and output shafts carry respective input and output sun gears meshed with compound planetary gears within a rotatable planet carrier. A pair of clutch packs selectively lock the planet carrier either to the input sun gear for rotation therewith as a unit for one mode of operation, or to the axle carrier case so that rotation of the planet carrier is prevented and the planet gears rotate about their axes to provide the other mode of operation. Compression springs are utilized to normally load the one clutch pack and lock the planet carrier to the input sun gear for the direct drive mode. A hydraulic bladder assembly is provided for shifting from the direct to the overdrive mode. Upon hydraulic inflation of the bladder, a bladder piston simultaneously unloads the one clutch pack and loads the other, locking the planet carrier to the axle carrier case. When the bladder is deflated, the compression springs retract the bladder piston, simultaneously unloading the overdrive clutch pack and loading the direct drive clutch pack. A one-way clutch maintains power transmission during the brief dwell time when both clutch packs are disengaged in shifting from one mode to the other. A power steering pump for the vehicle, coupled with an accumulator, may be utilized as the hydraulic power source.

10 Claims, 1 Drawing Sheet

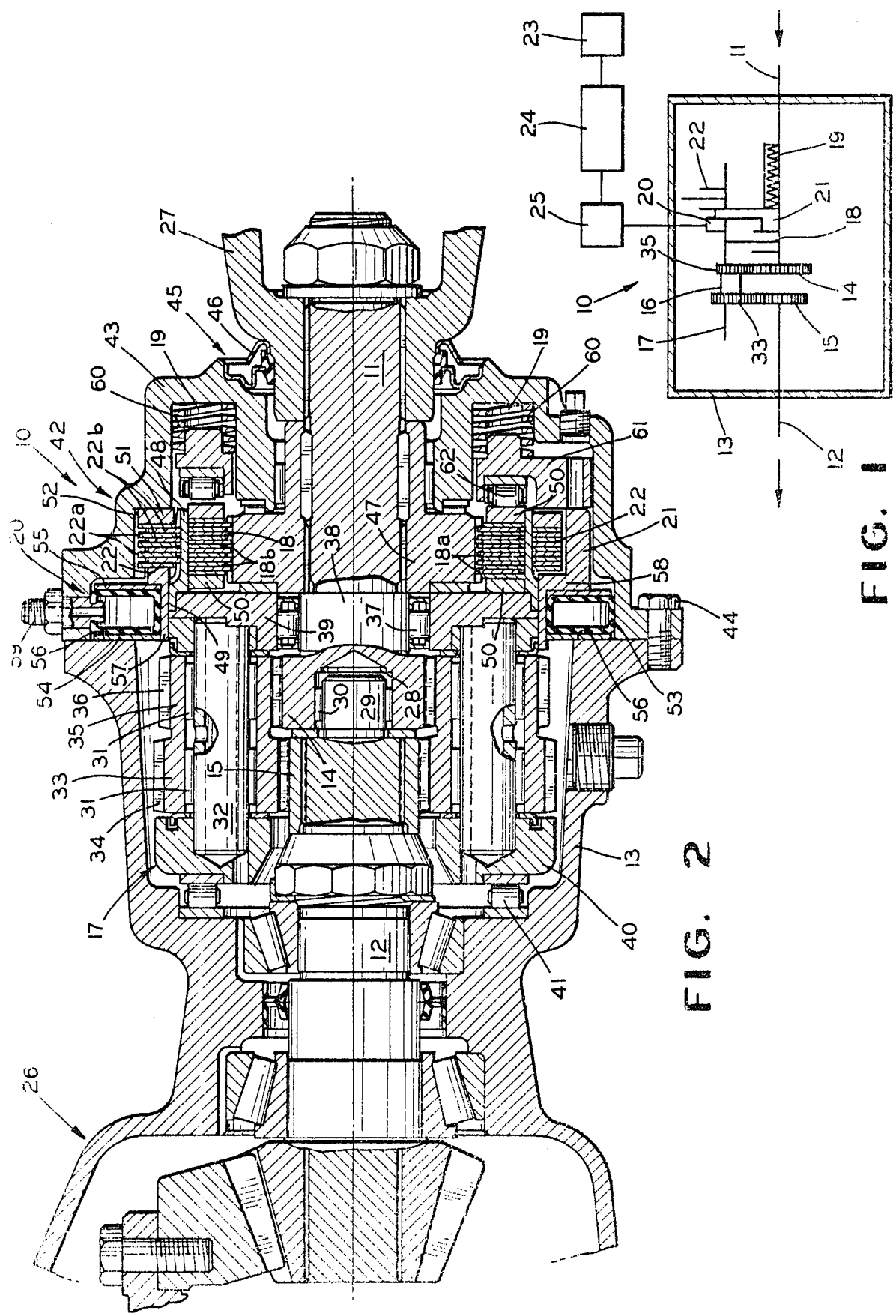

TWO SPEED AXLE ASSEMBLY

BACKGROUND OF THE INVENTION

1. Field of the Invention

The present invention relates generally to drive systems for transmitting torque from a power source such as an engine, to mechanism which is to be driven thereby, and more particularly to a two speed axle assembly for motor vehicles having improved shiftability.

2. Description of the Prior Art

Two speed axle assemblies are frequently employed in the drive train of motor vehicles such as automobiles and trucks so as to afford the driver the option to choose between direct drive and overdrive speed ratios, or between direct drive and underdrive speed ratios as the case may be, to adapt to changing load and speed conditions. Such two speed axle assemblies commonly employ sun gears and an associated planetary gearset, with shifting means for selectively locking the planetary gearset in the direct or the overdrive/underdrive mode. The shifting means employed heretofore have permitted undesirable gear racheting during shifting from one mode to the other, and may potentially permit dangerous free wheeling during the shifting. Thus, the planetary gearset of such axle assemblies must disengage in one mode before it engages in the other thereby, in effect, uncoupling the engine from the drive train so as to lose the driving or braking effect of the engine.

SUMMARY OF THE INVENTION

To obviate the above-noted problems there is provided in accordance with the present invention a two speed axle assembly comprising a planetary gearset mounted within an axle carrier and including an input sun gear, an output sun gear, and a plurality of compound planet gears mounted within a planet carrier. Two concentric multi-disc clutch packs are employed to lock the planetary gearset in either the direct or the overdrive/underdrive mode. When the planet carrier is locked to the input sun gear, the planetary gearset rotates as a unit, yielding a direct drive ratio. When the planet carrier is locked to the axle carrier, the axle is in the overdrive/underdrive mode, at a ratio determined by the planetary gearset. A one-way clutch maintains power transmission in the direct drive mode during the brief dwell time when both clutch packs are disengaged during shifting between modes.

The smaller diameter clutch pack is utilized for the direct drive mode, with compression springs loading the clutch pack and locking the planet carrier to the input sun gear. The larger diameter clutch pack alternatively engages to overdrive/underdrive mode by locking the planet carrier to the axle carrier, whereupon the compound planet gears rotate about their individual axes. Shifting between the direct and overdrive/underdrive modes is accomplished by means of a hydraulic bladder assembly. With the bladder deflated the compression springs load the direct drive clutch pack and retract a bladder piston maintaining the overdrive/underdrive clutch pack in unloaded condition. Upon hydraulic inflation of the bladder, the bladder piston simultaneously unloads the direct drive clutch pack and loads the overdrive clutch pack, locking the planet carrier to the axle carrier. When the bladder is deflated the compression springs retract the bladder piston, simultaneously unloading the overdrive/underdrive clutch pack and loading the direct drive clutch pack, with the system thus reverting to the direct drive mode.

The hydraulic system for loading the overdrive/underdrive clutch pack may advantageously utilize the power steering pump of the vehicle as the hydraulic power source, and includes an accumulator and a valve assembly. The pump maintains a minimum pressure in the accumulator, which is used to selectively pressurize the bladder for overdrive/underdrive mode operation.

BRIEF DESCRIPTION OF THE DRAWINGS

In the drawings, wherein like numerals refer to like parts throughout:

FIG. 1 is a schematic diagram of a two speed axle assembly embodying the invention; and FIG. 2 is an axial section through a two speed axle unit of the type depicted schematically in FIG. 1, and illustrating in detail a suitable construction in accordance with the invention.

DESCRIPTION OF A PREFERRED EMBODIMENT

Referring now to the drawings, and particularly to FIG. 1, there is shown schematically at 10 a two speed axle assembly in accordance with the invention in the drive line of an automotive vehicle. The two speed axle assembly as hereinabove indicated may include either direct and overdrive modes or direct and underdrive modes depending upon the particular gear ratios provided. The embodiment illustrated and described herein includes direct and overdrive modes. However it will be understood that by provision of suitable gears the device might as well provide direct and underdrive modes. Rotary drive from the vehicle engine is supplied to the two speed axle assembly 10 through an input or drive shaft 11. The two speed axle assembly has an output shaft 12 by which rotary power in either the direct or the overdrive mode is transmitted to a differential for driving the vehicle's drive wheels in the conventional manner.

The two speed axle assembly 10 includes a cylindrical carrier case 13 within which the input shaft 11 and the output shaft 12 are positioned in axial alignment. The input shaft carries an input sun gear 14 and the output shaft carries an output sun gear 15 at its end adjoining the input shaft. A plurality of compound planet gears 16, in this case four such gears, are carried equally spaced around the sun gears within a planet carrier 17. The compound planet gears are mounted for rotation about their respective axes in intermeshed relationship with the sun gears 14 and 15, while the planet carrier 17 is likewise mounted for rotation about its axis while carrying the compound planet gears intermeshed with the sun gears.

As illustrated schematically in FIG. 1 direct clutch pack 18, loaded by compression springs 19, locks the planet carrier 17 to the input sun gear 14. The planet carrier thus normally rotates with the input sun gear, causing the compound planet gears 16 to be locked to the input sun gear and consequently rotating the output sun gear 15 so that the two speed axle assembly operates in the direct drive mode. In order to shift from the direct drive mode to the overdrive mode an expandable bladder 20 is hydraulically inflated to displace a bladder piston 21 which simultaneously loads an overdrive clutch pack 22 and retracts the compression springs 19 to unload the direct drive clutch pack 18. Loading of the overdrive clutch pack locks the planet carrier 17 to the carrier case 13 so that the planet gears 16 are rotated about their axes by the input sun gear 14 and they, in turn, rotate the output sun gear 15 with the axle assembly in the overdrive mode.

The hydraulic system employed in inflating the bladder 20 preferably utilizes the power steering pump 23 of the vehicle as the source of pressurized hydraulic fluid. The power steering pump maintains a minimum pressure in an accumulator 24, and flow of pressurized fluid from the accumulator is controlled by a valve assembly 25 to selectively pressurize the bladder for shifting from the direct to the overdrive mode. Upon release of the pressure the springs 19 retract the bladder piston 21, collapsing the bladder 20 and loading the clutch pack 18 so that the axle assembly reverts to the direct drive mode. Utilizing the pump to maintain a minimum pressure in the accumulator to provide for periodic inflation of the bladder permits intermittent operation of the pump and avoids the necessity for cooling of the hydraulic fluid.

There is shown in detail in FIG. 2 one suitable construction of the novel two speed axle assembly 10. As illustrated therein the carrier case 13 forms the forward portion of the axle assembly 26 of a motor vehicle. The input shaft 11 is connected as by a universal joint 27 to the drive shaft (not shown) of the vehicle, and the output shaft 12 of the two speed axle assembly extends into the axle assembly as the pinion shaft thereof.

The input sun gear 14 affixed to the end of the input shaft 11 has a counterbore 28 into which a reduced diameter end segment 29 of the output shaft 12 extends for relative rotary movement within bearings 30. The output sun gear 15 is thus affixed on the output shaft 12 in axial alignment with the input sun gear 14 and is of somewhat smaller diameter than the input sun gear, the relative sizes being determined so as to provide the desired change in gear ratio upon shifting between the direct and overdrive modes. By way of example, an axle overdrive ratio of 1.24 to 1.0 has been found suitable for many purposes.

The compound planet gears 16 are rotatably mounted in the planet carrier 17 and spaced around the sun gears 14 and 15. In order to distribute the torque load the planet carrier preferably includes four of the compound planet gears spaced at 90 degree intervals around the sun gears. Each compound gear 16 is mounted by bearings 31 for rotation on a shaft 32 carried by the planet carrier 17, and each includes a larger diameter segment 33 having gear teeth 34 engaged with the teeth of the output sun gear 15 and a smaller diameter segment 35 having gear teeth 36 engaged with the teeth of the input sun gear 13. A one-way clutch 37 acts between a flange 38 of the input sun gear 14 and an end plate 39 of the planet carrier 14 to maintain continuous power transmission through the two speed axle assembly during the momentary dwell time when both clutch packs 18 and 22 are disengaged in shifting between the direct and overdrive modes. The one-way clutch 37 maintains a direct drive ratio and thus avoids any uncoupling of the engine from the drive train during the dwell period. At the opposite end of the planet carrier the frame 40 thereof is urged endwise against a thrust bearing 41 as will be hereinafter explained.

The cylindrical carrier case 13 is open at its forward end and has affixed thereto a dual clutch assembly, identified generally at 42, which includes the aforementioned direct drive clutch pack 18 and the overdrive clutch pack 22. More particularly, the dual clutch assembly comprises a cylindrical housing 43 affixed to the carrier case 13 as by a plurality of studs 44 spaced around its periphery, only one of which is shown. The cylindrical housing includes a central opening 45 for receiving a neck at the rear of the universal joint 27 and through which the input shaft 11 extends. A seal 46 is provided around the neck of the universal joint within the opening 45. The dual clutch assembly 42 includes a hub 47 spined to the input shaft 11 for rotation therewith. An intermediate sleeve 48 is affixed to the end plate 39 of the planet carrier 17 as by an edge flange 49. Discs 18a of the clutch pack 18 are affixed to the clutch hub 47 while alternate discs 18b are affixed to the intermediate sleeve 48. The clutch pack 18 includes pressure plates 50 on either side of the disc assembly. Thus, upon loading of the clutch pack 18 by the springs 19 compressing the discs 18a and 18b between the pressure plates as will be hereinafter explained and as illustrated in the lower portion of FIG. 2, the clutch pack locks the planet carrier to the input shaft, resulting in a direct drive gear ratio.

Discs 22a of the clutch pack 22 are affixed to the housing 43, and alternate discs 22b thereof are affixed to the intermediate sleeve 48. The clutch pack includes a pressure plate 51 adapted to engage an annular wall 52 of the cylindrical housing 43. Consequently, upon loading of the clutch pack 22 and unloading of the clutch pack 18 by extension of the bladder piston 21, the planet carrier 17 is locked to the carrier case 13 as illustrated in the upper portion of FIG. 2, preventing it from rotating as a unit with the input shaft 11 and resulting in the overdrive gear ratio.

As heretofore described, shifting of the two speed axle assembly into either the direct or the overdrive mode is effected by interaction of the compression springs 19 and the bladder assembly 20. In order to show the unit in both modes, it has been illustrated in the upper portion of FIG. 2 in the overdrive mode and in the lower portion in the direct drive mode.

The bladder assembly 20 is positioned at the juncture of the carrier case 13 and the cylindrical housing 43 of the clutch assembly 42, and includes a toroidal bladder 53 confined between first and second wall plates 54 and 55. The first wall plate 54 abuts the end surface 56 of the carrier case while the second wall plate 55 engages the cylindrical bladder piston 21. The bladder piston more particularly comprises an axially movable ring portion 57 extending between the base of the bladder and the end plate 39 and sleeve 48 and restraining the bladder against inward expansion. A flange 58 extends from the ring portion 57, with one side thereof abutting the second wall plate 55 and the other side being adapted to engage and urge the overdrive clutch pack 22 against the friction plate 51 within the annular wall 52 in the housing 43 upon expansion of the bladder 53 to load the clutch pack as will be hereinafter explained. In order to provide for selective inflation and deflation of the bladder, there is provided a nipple 59 extending through the wall of the housing 43 and into sealed communication with the interior of the bladder. The nipple is connected by means of a suitable hydraulic line (not shown) with the pump 23, accumulator 24 and control valve 25.

The housing 43 is provided with a plurality of counterbores 60 spaced circumferentially therearound for receiving the individual compression springs 19. The compression springs are seated against the base of the counterbores, and at their opposite ends abut an axially moveable thrust collar 61. There is carried on the thrust collar a thrust bearing 62 adapted to engage the adjacent pressure plate 50 of the direct drive clutch pack 18. As illustrated in the lower portion of FIG. 2, the compression springs 19 thus normally urge the pressure plates 50, by means of the thrust bearing 62 and end plate 39, toward one another to load the direct drive clutch pack and lock the planet carrier 17 to the input shaft 11 and input sun gear 14. When the bladder 53 is inflated the piston 21 is extended to retract the thrust collar 61 and thrust bearing 62, unloading the direct drive clutch pack 18 and loading the overdrive clutch pack 22 as illustrated in the upper portion of FIG. 2.

Reviewing briefly operation of the novel two speed axle assembly, with the bladder 53 in its normally deflated condition the dual clutch assembly assumes the direct drive configuration as illustrated in the lower portion of FIG. 2. Thus, the compression springs 19 urge the thrust collar 61 and thrust bearing 62 toward the adjacent pressure ring 50, in turn loading the direct drive clutch pack 18 and locking the planet carrier 17 to the clutch hub 47 and input shaft 11. The input sun gear 14, affixed to the input shaft, meshes with the segments 35 of the compound planet gears and locks them against rotation about their shafts 32 as the planet carrier rotates with the input shaft. The segments 33 of the compound planet gears mesh with the output sun gear 15 and thus cause rotation of the output shaft 12 in response to rotation of the planet carrier.

In order to shift into the overdrive mode the vehicle operator manipulates the control valve 25 to admit hydraulic fluid under pressure from the pump 23 and the accumulator 24 to the toroidal bladder 53. The bladder expands laterally, forcing the second wall plate 55 to extend the bladder piston 21 so as to load the overdrive clutch pack 22 and depress the thrust collar 61. The planet carrier 17 is thus substantially simultaneously unlocked from the input shaft 11 and locked to the carrier case 13, with the one-way clutch 37 serving to maintain power transmission during the brief dwell period while both clutch packs are disengaged. Upon rotation of the input shaft 11, the compound planet gears 16 are rotated upon their shafts 32 by the segments 35 meshing with the input sun gear 14, and the segments 33 in turn rotate the output sun gear 15 and output shaft 12 at the overdrive ratio. To revert to the direct drive mode, the vehicle operator manipulates the control valve 25 to release the pressurized hydraulic fluid from the bladder, and the compression springs 19 urge the parts back to their direct drive positions. As will be readily apparent, should hydraulic pressure be lost for any reason the system will automatically revert to the direct drive mode.

Inasmuch as the two speed axle assembly utilizes the power steering pump of the vehicle for its operation and the hydraulic system is isolated from the gear case by confinement within the bladder assembly, a common lubricant may be utilized for both hypoid and helical gear lubrication. The hydraulic system does not require a hydraulic heat exchanger, and the shifting mechanism eliminates the gear racheting and potential free-wheeling commonly associated with two speed axle assemblies.

It is to be understood that the form of the invention herewith shown and described is to be taken as an illustrative embodiment only of the same, and that various changes in the shape, size and arrangement of parts may be resorted to without departing from the spirit of the invention.

What is claimed is:

1. A two speed axle assembly comprising an input sun gear, an output sun gear, a planet carrier mounted for rotation about said input and output sun gears, at least one compound planetary gear rotatably mounted on said planet carrier and drivingly connected to said input sun gear and said output sun gear, first clutch means for selectively locking said planet carrier relative to said input sun gear for rotation therewith including means normally loading said first clutch means whereby said planet carrier rotates said input sun gear, second clutch means for alternatively locking said planet carrier against rotation whereby said compound planet gear rotates on said planet carrier in response to rotation of said input sun gear, and inflatable bladder means adapted when selectively inflated to load said second clutch means and simultaneously unload said normally loaded first clutch means whereby said planet carrier is unlocked relative to said input sun gear and locked against rotation, including means selectively supplying hydraulic fluid under pressure to said bladder means, said means supplying hydraulic fluid comprising accumulator means, pump means remote from said axle assembly for pressurizing said hydraulic fluid and maintaining a supply of said fluid under at least a minimum pressure in said accumulator means, and valve means for selectively admitting said pressurized fluid from said accumulator means to said bladder means to inflate said bladder means and relieving the pressure to deflate said bladder means.

2. A two speed axle assembly as claimed in claim 1, including a housing case, an input shaft mounted for rotation in said housing case upon which said input sun gear is carried, and an output shaft mounted for rotation in said housing case on which said output sun gear is carried, said second clutch means locking said planet carrier to said housing case to prevent rotation when said bladder means is inflated.

3. A two speed axle assembly as claimed in claim 2, wherein said first clutch means comprises a first clutch pack, and including compression springs acting to normally load said first clutch pack.

4. A two speed axle assembly as claimed in claim 3, wherein said bladder means includes a bladder piston adapted to be advanced upon inflation of said bladder means, said bladder piston simultaneously loading said second clutch means and retracting said compression springs to unload said first clutch pack as it is advanced.

5. A two speed axle assembly as claimed in claim 4, wherein said bladder piston is of annular configuration, said bladder means comprising a toroidal bladder confined within said housing case and abutting said piston on one side, including means limiting said toroidal bladder to expansion toward said bladder piston.

6. A two speed axle assembly as claimed in claim 1, wherein loading of said first clutch means places said axle assembly in a first drive mode and loading of said second clutch means places said axle assembly in a second drive mode, including a one way clutch maintaining power transmission in said first mode during said loading and unloading of said first and second clutch means.

7. A two speed assembly for a vehicle having a hydraulic power steering pump, comprising an input sun gear, an output sun gear, a planet carrier mounted for rotation about said input and output sun gears, at least one compound planetary gear rotatably mounted on said planet carrier and drivingly connected to said input sun gear and said output sun gear, first clutch means for selectively locking said planet carrier relative to said input sun gear for rotation therewith including means normally loading said first clutch means whereby said planet carrier rotates said input sun gear, second clutch means for alternatively locking said planet carrier against rotation whereby said compound planet gear rotates on said planet carrier in response to rotation of said input sun gear, bladder means including an inflatable bladder adapted when selectively inflated to load said second clutch means and simultaneously unload said normally loaded first clutch means whereby said planet carrier is unlocked relative to said input sun gear and locked against rotation, a cylindrical housing case, a rotatable input shaft extending into said case, said input sun gear being carried upon said input shaft within said case, a rotatable input shaft extending from said case and axially aligned with said input shaft, said output gear being carried upon said output shaft within said case, said first clutch means comprising a first annular clutch pack and said second clutch means comprising a second annular clutch pack concentrically surrounding said first clutch pack, said second clutch pack locking said planet carrier to said housing case to prevent rotation when said bladder is inflated, and means selectively supplying hydraulic fluid under pressure to said bladder to inflate said bladder and advance said bladder piston, and for relieving the pressure in said bladder whereupon said bladder piston is retracted by said thrust collar and compression springs, said means supplying hydraulic fluid to said bladder comprising accumulator means receiving pressurized hydraulic fluid from said power steering pump and maintaining a supply of said fluid under at least a minimum pressure, and valve means for selectively admitting said pressurized fluid from said accumulator means to said bladder to inflate said bladder and relieving the pressure to deflate said bladder.

8. A two speed axle assembly as claimed in claim 7, including an axially moveable annular thrust collar operable to load said first clutch pack, and compression springs urging said thrust collar toward said first clutch pack for normally loading said first clutch pack.

9. A two speed axle assembly as claimed in claim 7, including an annular bladder piston adapted to be axially advanced upon inflation of said bladder means, said bladder means comprising a toroidal bladder confined within said case and abutting said piston on one side, with means limiting said toroidal bladder to expansion toward said bladder piston.

10. A two speed axle assembly as claimed in claim 9, including an axially moveable annular thrust collar operable to load said first clutch pack, and compression springs urging said thrust collar toward said first clutch pack for normally loading said first clutch pack, said piston including means for loading said second clutch pack and means engaging said thrust collar to retract said thrust collar against said compression springs and unload said first clutch pack upon hydraulic inflation of said bladder.

* * * * *